US007930694B2

(12) United States Patent
Anderson et al.

(10) Patent No.: US 7,930,694 B2
(45) Date of Patent: Apr. 19, 2011

(54) METHOD AND APPARATUS FOR CRITICAL SECTION PREDICTION FOR INTELLIGENT LOCK ELISION

(75) Inventors: Craig S. Anderson, Sunnyvale, CA (US); Santosh G. Abraham, Pleasanton, CA (US); Stevan Vlaovic, Cupertino, CA (US)

(73) Assignee: Oracle America, Inc., Redwood City, CA (US)

( * ) Notice: Subject to any disclaimer, the term of this patent is extended or adjusted under 35 U.S.C. 154(b) by 1654 days.

(21) Appl. No.: 10/936,901

(22) Filed: Sep. 8, 2004

(65) Prior Publication Data

US 2006/0053351 A1 Mar. 9, 2006

(51) Int. Cl.
*G06F 9/46* (2006.01)
*G06F 13/00* (2006.01)

(52) U.S. Cl. ........ 718/100; 718/104; 711/150; 711/152; 711/156

(58) Field of Classification Search ............... 718/1, 100, 718/101, 102, 103, 104, 105; 711/150, 151, 711/152, 153, 154, 163, 158
See application file for complete search history.

(56) References Cited

U.S. PATENT DOCUMENTS

| 6,460,124 | B1 * | 10/2002 | Kagi et al. | 711/163 |
|---|---|---|---|---|
| 7,120,762 | B2 * | 10/2006 | Rajwar et al. | 711/150 |
| 7,370,211 | B2 * | 5/2008 | Rindborg et al. | 713/191 |
| 2002/0138706 | A1 * | 9/2002 | Hugly | 711/163 |
| 2003/0079094 | A1 * | 4/2003 | Rajwar et al. | 711/150 |
| 2004/0025160 | A1 * | 2/2004 | Dice et al. | 718/102 |
| 2004/0162948 | A1 | 8/2004 | Tremblay et al. | 711/137 |
| 2005/0268073 | A1 * | 12/2005 | Karp | 712/207 |
| 2007/0186215 | A1 * | 8/2007 | Rajwar et al. | 718/102 |

OTHER PUBLICATIONS

Kue-Hwan Sihn, Joonwon Lee, Jung-Wan Cho; A Speculative Coherence Scheme using Decoupling Synchronization for Multiprocessor Systems; pp. 1-4; IEEE 2003.*
Ravi Rajwar; Speculation-Based Techniques for Transactional Lock-Free Execution of Lock-Based Programs; University of Wisconsin—Madison 2002; pp. 1-209.*
Rajwar, et al., "Speculative Lock Elision: Enabling Highly Concurrent Multithreaded Execution", *The Proceedings of the 34th International Symposium on Microarchitecture (MICRO)*, Dec. 3-5, 2001.

* cited by examiner

*Primary Examiner* — Lewis A Bullock, Jr.
*Assistant Examiner* — Abdullah Al Kawsar
(74) *Attorney, Agent, or Firm* — Martine Penilla & Gencarella, LLP

(57) ABSTRACT

Intelligent prediction of critical sections is implemented using a method comprising updating a critical section estimator based on historical analysis of atomic/store instruction pairs during runtime and performing lock elision when the critical section estimator indicates that the atomic/store instruction pairs define a critical section.

20 Claims, 9 Drawing Sheets

- 132 — GENERATE ACST ENTRY FOR EACH ATOMIC
- 134 — UPDATE CSP BASED ON ACST DATA TO REFLECT LIKELIHOOD OF ELIDABLE LOCK

| Program Counter | Confidence Value |
|---|---|
| 0x1032f44 | 0x10 |
| 0x1029aa4 | 0x00 |
| 0xaa23ddc | 0x11 |
| 0xffffad40 | 0x01 |
|  |  |
|  |  |

| Program Counter | Memory Address | Previous Value |
|---|---|---|
| 0x1032f44 | 0x32cff4 | 0x0 |
| 0x1029aa4 | 0x4a872c8 | 0x3401 |
|  |  |  |
|  |  |  |

METHOD AND APPARATUS FOR CRITICAL SECTION PREDICTION FOR INTELLIGENT LOCK ELISION

BACKGROUND OF THE INVENTION

1. Field of the Invention

The present invention relates generally to microprocessor architecture and in particular to a method of identifying and targeting suitable critical sections for intelligently eliding exclusive locks.

2. Description of the Related Art

Throughput computing takes advantage of thread-level parallelism in applications to increase overall performance. In general, the greater amount of thread-level parallelism available in an application, the greater the potential speedup. One impediment to high speedup is the presence of critical sections in the application's code.

A critical section is a section of code that can only be executed by one thread at a time. Some synchronization mechanism is required at the entry and exit of the critical section to ensure exclusive use. Typically, this mechanism involves exclusive locks. Critical sections are an important means to guarantee that while one thread is reading and/or writing a particular piece of data, other threads are not trying to access the same data. By restricting access to one thread at a time, access to the data within the critical section is serialized. Critical sections are often implemented by associating an exclusive lock with each critical section.

Exclusive locks are small data areas set up so that only one thread can change the value from unlocked to locked (and thus acquire the lock) no matter how many other threads are attempting to change the value at the same time. In order to execute a critical section, a thread must acquire the associated exclusive lock before executing any instructions within the critical section. Since only one thread can possess a given lock at any one time, only one thread can be executing inside the corresponding critical section. If a thread t1 wishes to execute a critical section, but the associated lock is held by another thread t2, t1 must wait until the thread holding the lock (t2) exits the critical section and unlocks the lock. Locks are usually implemented using atomic instructions, which perform two or more operations indivisibly. Often, the two operations are a load from memory address, and a conditional or unconditional store to the same address.

Unfortunately, critical sections and their associated locks can reduce performance in multi-threaded applications, sometimes drastically so. The performance reduction can be attributed to two factors. The first and most important factor is lock contention, which occurs when a thread tries to acquire a lock that is already held by another thread, and fails. In most cases, the failing thread waits (i.e., performs no more useful work) until it can acquire the needed lock. In a simple lock implementation, the failing thread continuously tries to acquire the lock until it succeeds. This activity is called spin waiting, and results in wasting valuable processing cycles waiting until the lock variable is unlocked.

Alternatively, the waiting thread's execution can be suspended until the lock becomes free. This has the advantage that the waiting thread doesn't waste processor cycles by endlessly checking if the lock has been unlocked. Unfortunately, the act of suspending and resuming a thread requires a large number of processor cycles itself, sometimes more than spin waiting. In addition, suspending the thread reduces the number of threads in the application that can perform useful work, just as spin waiting does. If the number of available threads is less than the number of available processors, then hardware resources can become idle.

The second most influential cost of locking is executing the underlying atomic instruction that is used to acquire (and sometimes release) the lock. In order to fulfill memory consistency requirements, an atomic instruction may require waiting for pipelines to drain, flushing store buffers, and other performance degrading operations (depending on the processor implementation). Unlike the case with lock contention, the cost of acquiring the lock must be paid whether the lock is contended or not.

Because acquiring and releasing locks can be expensive, and writing code involving large numbers of coordinated critical sections is often difficult (because of problems like deadlock, livelock, etc.) critical sections often protect larger amounts of data than is necessary for application correctness. By encapsulating more data than is required in a critical section, coarse grain locking is implemented. Coarse-grain locking reduces the amount of locking that is required, and makes it easier to write correct multi-threaded applications, but increases lock contention. The increased lock contention is due to two or more threads contending for the same lock even though the threads may access completely disjoint sets of data. Ideally, one would like to have the benefits of coarse-grain locking without increased lock contention.

One technique used to get the benefits of coarse grain locking but without some of the drawbacks is speculative locking, which was introduced as Speculative Lock Elision (SLE) by Rajwar and Goodman in their paper entitled, "Speculative Lock Elision: Enabling Highly Concurrent Multithreaded Execution" presented in the proceedings of the 34th International Symposium on Microarchitecture, Dec. 3 through Dec. 5, 2001, Austin Tex., herein incorporated by reference in its entirety. Speculative locking allows coarse-grain level locking while decreasing lock contention. In speculative locking, a locking thread assumes that the data it accesses in the critical section will not be accessed by another thread until after the locking thread exits the critical section. Thus, two threads can speculatively execute in the same critical section at the same time, provided their data accesses do not interfere, which reduces the lock contention caused by coarse grain locking. It also permits threads to speculatively elide the lock controlling the critical section, since two or more threads may simultaneously execute the same critical section.

An important obstacle in implementing speculative locking is identifying where critical sections begin and end. As atomic instructions are used for purposes other than acquiring critical section locks, assuming that all atomic instructions start critical sections would lead to the speculative locking being used where it should not be. Thus being able to identify the start and end of critical sections is key to getting the benefits of speculative locking.

The SLE work done by Rajwar and Goodman assumes that a sequence of load locked/store conditional (atomic) instructions to the same address signals the start of a critical section. However, this assumption is not actually tested against actual execution sequences. In practice, research on large-scale commercial applications indicates that atomic instructions (such as compare-and-swap) are used for multiple purposes including locking but also for atomically incrementing a value. Atomic instructions are also used, along with regular store instructions, for unlocking as well. Thus a simple heuristic that assumes all atomic instructions begin critical sections is unrealistic for large commercial applications.

Furthermore, hardware mechanisms for speculatively locking are effective only with small critical sections because all loads and stores must be held in hardware buffers while executing in the critical section. Buffering loads and stores is necessary to maintain the effective atomicity of the critical section. Though the majority of dynamic critical sections are small, some critical sections are so large that the number of load/store buffers needed to lock speculation is too expensive to implement. When such critical sections are speculatively executed, the speculation fails because of insufficient buffer size.

Speculative locking can also fail if two threads execute memory operations which interfere with one another while one (or both) of the threads is speculative locking. Unfortunately, the performance impact of failed speculation is significant since the processor must revert to the architectural state at the beginning of the critical section, then re-execute the entire critical section after acquiring the lock. Since the price of misspeculating is so costly, separating those critical sections that are likely to cause speculation to fail from those in which speculation will succeed is necessary. Previous work used very simple static mechanisms to identify and target critical sections for lock elision. However, these simple measures lead to unacceptably high amounts of misspeculation occurring. A hardware mechanism that can dynamically identify those critical sections that are amenable to hardware lock elision is required.

SUMMARY OF THE INVENTION

Broadly speaking, the present invention relates to a technique for improving microprocessor performance, specifically in a multiple-processor environment.

It should be appreciated that the present invention can be implemented in numerous ways, including as a process, an apparatus, a system, a device, or a method. Several inventive embodiments of the present invention are described below.

In one embodiment, the present invention provides method for predicting critical sections, comprising updating a critical section estimator based on historical analysis of atomic/store instruction pairs during runtime, and performing lock elision when the critical section estimator indicates said atomic/store instruction pairs define a critical section.

In another embodiment, a method for eliding locks on critical sections, comprises determining whether a current instruction is of a type that is tracked by a short section indicator, incrementing a short section indicator counter when the current instruction is of this type, and avoiding lock elision when the short section indicator counter is above the threshold.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
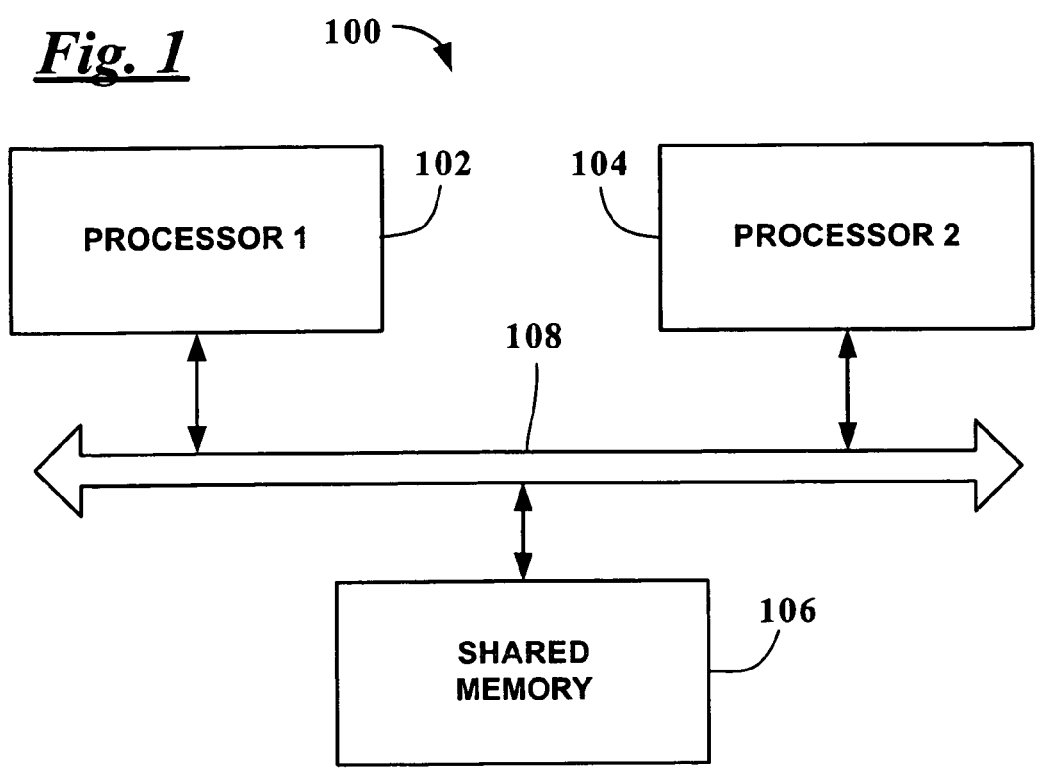
FIG. 1 shows a schematic block diagram of a system in which the present invention may be incorporated.

The invention relates to a method of identifying and targeting suitable critical sections for intelligently eliding exclusive locks. FIG. 1 shows computer system 100 comprising a first processor 102 and a second processor 104. Each processor 102, 104 is in communication with shared memory 106 via, for example, a bus 108. To prevent collisions when processors 102, 104 simultaneously access the same memory location, programmers will place code that could otherwise cause collisions within an exclusive lock.

Figure 2:
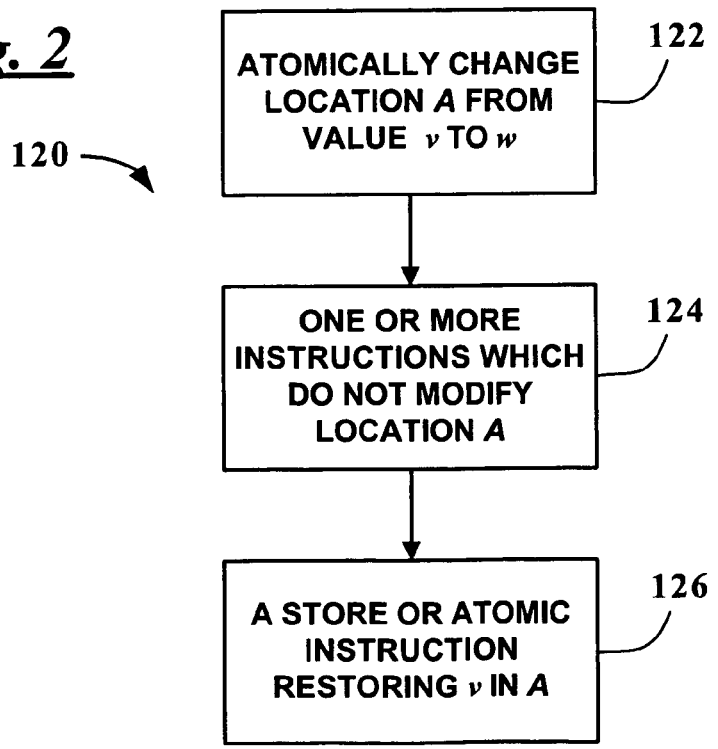
FIG. 2 shows a flowchart representation of a pattern in code indicative of an exclusive lock.

FIG. 2 shows a flowchart 120 describing an instruction pattern having atomic/store instruction pairs that suggests the presence of an exclusive lock in code. An exclusive lock is generally identifiable by an instruction that atomically changes a location A in memory from a value v to a value w shown by block 122; one or more instructions which do not modify location A as shown by block 124; and a store or atomic instruction that restores value v in A as shown by block 126. To intelligently elide a lock, it would be beneficial to look for this pattern in code and not simply assume that every atomic instruction begins an exclusive lock.

Figures 3, 4, 5:
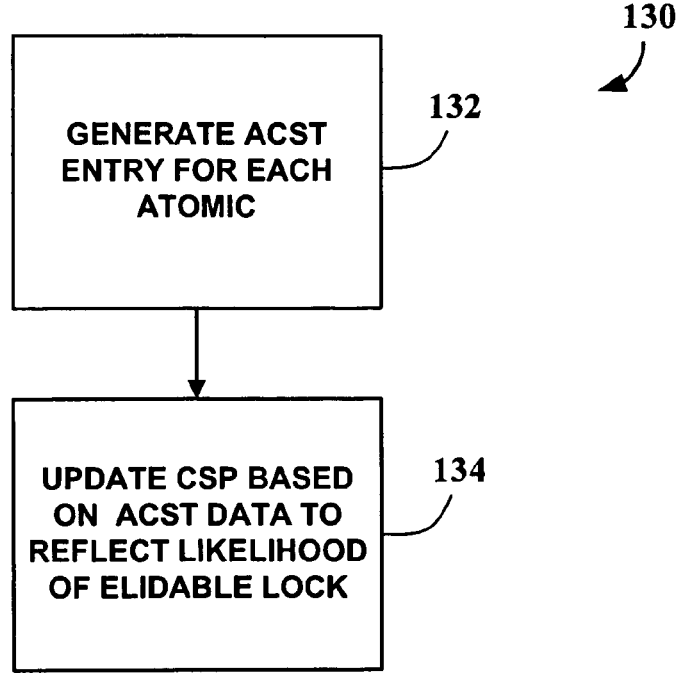
FIG. 3 shows a flowchart presenting generalized process for critical section prediction.
FIG. 4 shows an exemplary Critical Section Predictor (CSP)
FIG. 5 shows an exemplary Active Critical Section Table (ACST)

FIG. 3 shows a flowchart 130 depicting an overview of a process for intelligent lock elision comprising essentially two steps. First, an entry in an Active Critical Section Table (ACST) is created for each atomic instruction as shown by block 132. Second, a Critical Section Predictor (CSP) is updated based on ACST data to reflect the likelihood that a particular atomic begins an exclusive lock that can be intelligently elided. As will be made clear, the ACST provides historical data on atomic instructions that can be referenced to determine if a particular atomic indeed starts an intelligently elidable exclusive lock. Therefore, the ACST provides a list of entries, each corresponding to a potential open (nested) critical sections.

FIG. 4 shows an exemplary CSP, which is a table having a first column 142 containing program counter data of specific atomics that may start a critical section and a second column 144 containing a confidence value that indicates the confidence that the atomic indeed starts a critical section and may be intelligently elided. The confidence value is otherwise termed a "critical section estimator" as the confidence value provides an indicator of the start of the critical section. Exemplary data is shown for illustrative purposes only. The CSP serves as a reference to determine when a specific atomic starts a critical section, and whether that critical section may be intelligently elided. The confidence value may be stored in an N-bit saturating up/down counter. For example, a two bit saturating up/down counter that can contain the values from 0 to 3.

FIG. 5 shows an exemplary ACST 150 containing three columns: A first column 152 containing program counter number of a recent atomic instruction; a second column 154 containing the address of a memory location that the atomic instruction accessed, and a third column 156 containing the value stored in that memory location prior to it being changed by the atomic instruction. Exemplary data is shown for illustrative purposes only and does not form part of the invention.

In the exemplary embodiment, the ACST and CSP are not shared among processors, so each processor maintains their own ACST and CSP. The ACST is sufficiently large to accommodate nested critical sections as may be encountered. An exemplary length of the ACST is 4 entries, each entry shown as a row of data. The CSP should be sufficiently large to accommodate the number of active critical sections in the code. Because even complex code often calls the same few functions that contain the same critical sections from many places in the program, there may be very few actual critical sections having locks that may be elided. An exemplary size of the CSP would be about 64 entries.

Figure 6:
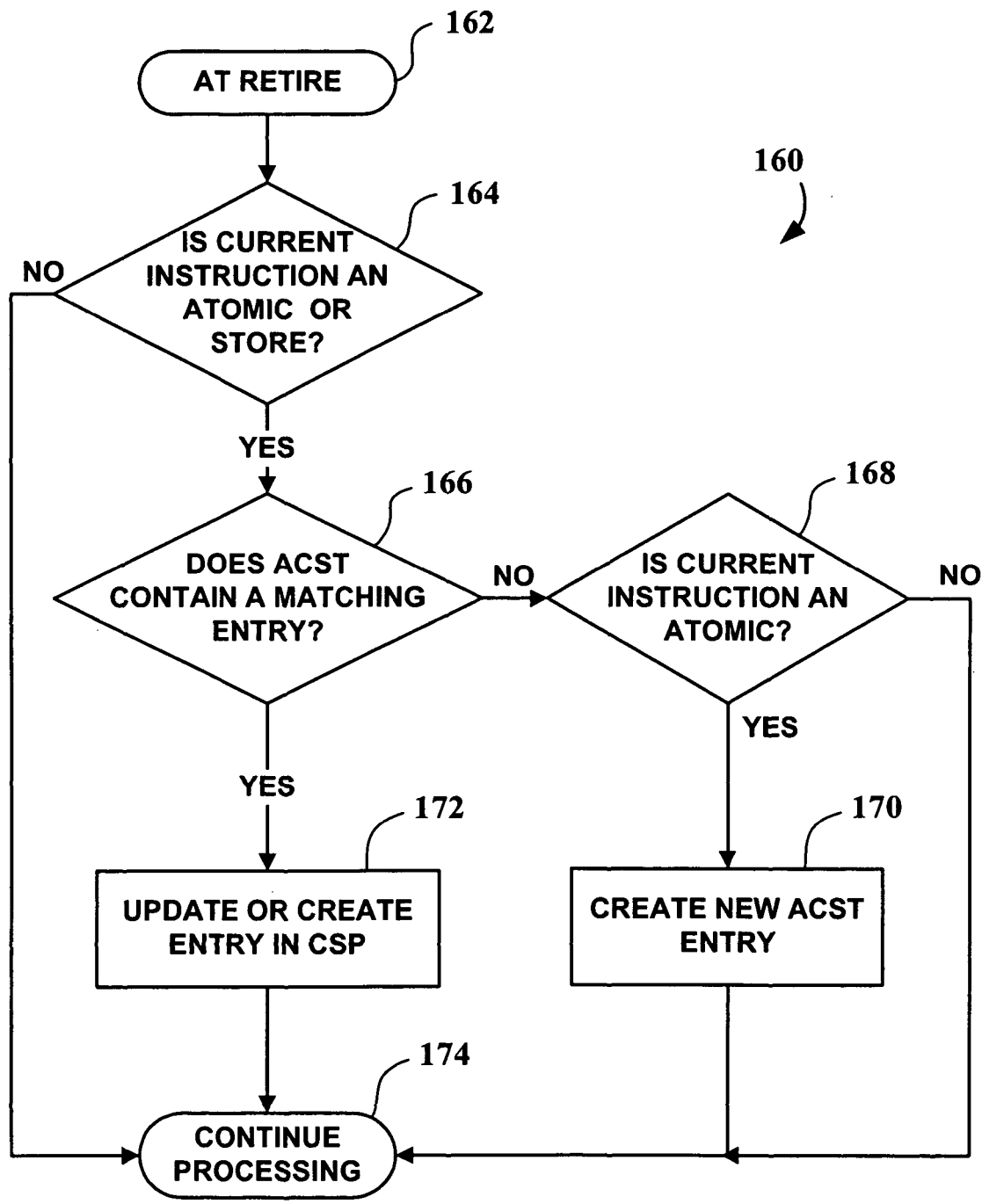
FIG. 6 shows a flowchart depicting an exemplary process for populating a CSP and an ACST.

FIG. 6 shows an exemplary flow chart 160 depicting a method for populating the ACST and CSP. This process is executed when an instruction is retired as indicated by starting block 162. Block 164 tests the type of instruction. If the instruction is not an atomic or store instruction, then the procedure flows to ending block 174 and execution proceeds as before. If the instruction is an atomic or store, then execution proceeds from block 164 to block 166 wherein the ACST is searched for an entry having a memory address matching the memory address the current instruction is to access.

If the ACST does not contain a matching entry, the execution proceeds to block 168 to determine if the current instruction is an atomic. If it is not, then the process ends with ending block 174 and the processor retires the instruction normally. However, if the current instruction is an atomic, then a new entry is created in the ACST for the current instruction as indicated by block 170. If necessary, an existing entry is evicted to make room for the new entry according to some eviction algorithm. For example, the oldest entry in the ACST may be evicted and replaced with the new entry.

Returning back to block 166, the case where the ACST does contain a matching entry will now be considered. In this case, the procedure flows to block 172 wherein information in the existing ACST entry is used to update or create an entry in the CSP. For example, if the current instruction is storing in the same memory location as listed in the ACST entry the same value v that matches the original value stored in the ACST entry, then the CSP entry is incremented to indicate increased confidence that the instruction pointed to by the instruction counter entry in the ACST is the start of an elidable critical section. Otherwise, it is decremented to indicate decreased confidence. This procedure will be described in greater detail below.

Figure 7:
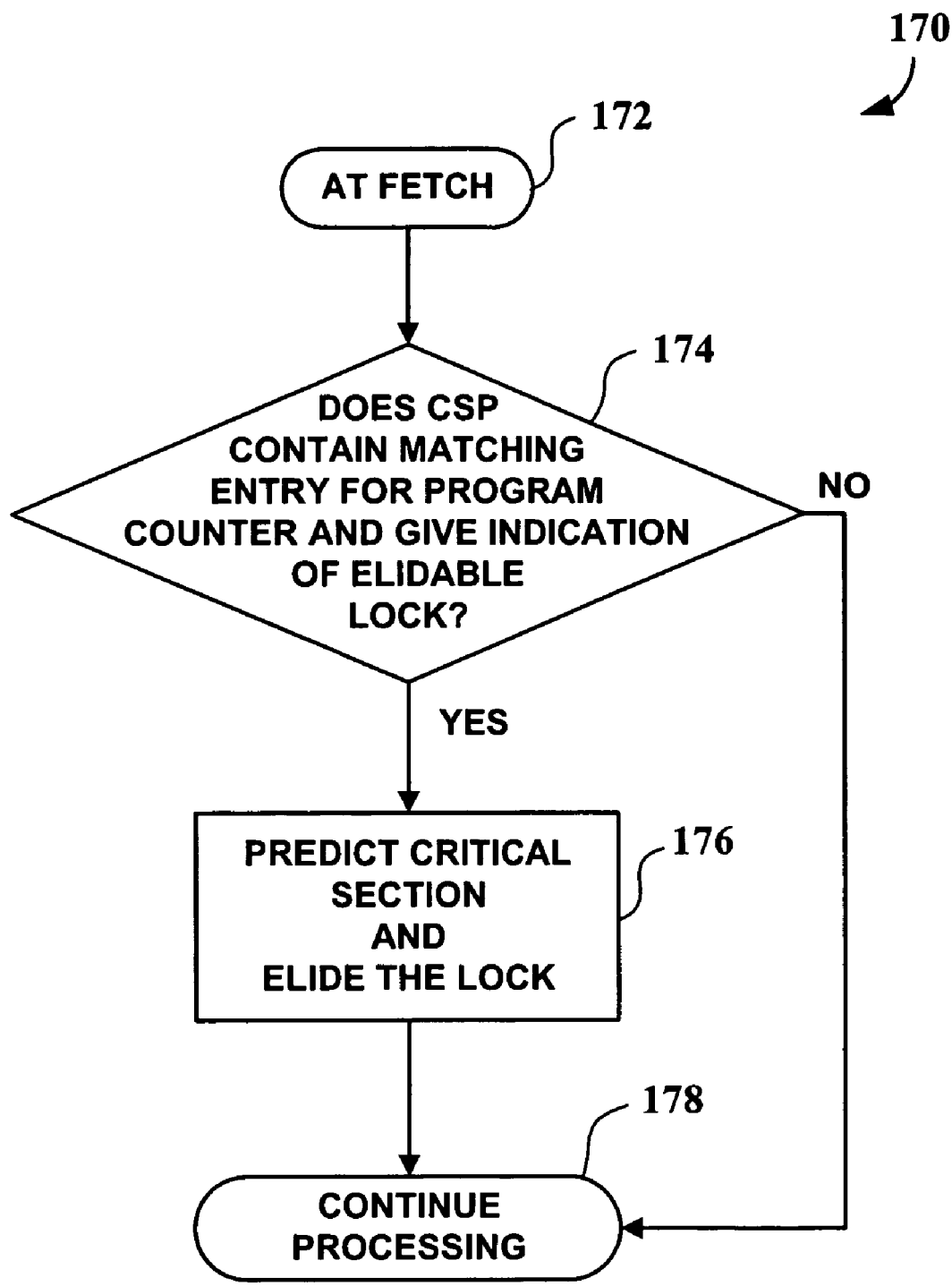
FIG. 7 shows a flowchart depicting an exemplary process for performing intelligent lock elision.

FIG. 7 provides a flow chart 170 showing an overview method for utilizing the CSP to perform intelligent lock elision. This procedure is performed when an instruction is fetched as indicated by starting block 172. Block 174 tests whether the CSP contains an entry having a program counter number matching the program counter for the current instruction. If so, the confidence value in the CSP entry is read to determine if it indicates an exclusive lock that can be elided. If not, the procedure flows to ending block 178 whereupon execution of the fetched instruction continues. If, at block 174, it is determined from CSP data that the fetched instruction is the start of a critical section whose lock can be intelligently elided, then the procedure flows to block 176 whereupon the processor predicts that the current instruction starts a critical section and elides the lock in the known manner set forth, for example, in the Rajwar and Goodman paper cited above and incorporated herein by reference. For example, the fetched instruction would not be executed (thereby eliding the lock) and all loads and stores would be cached until the end of the critical section in case of failure.

Figure 8:
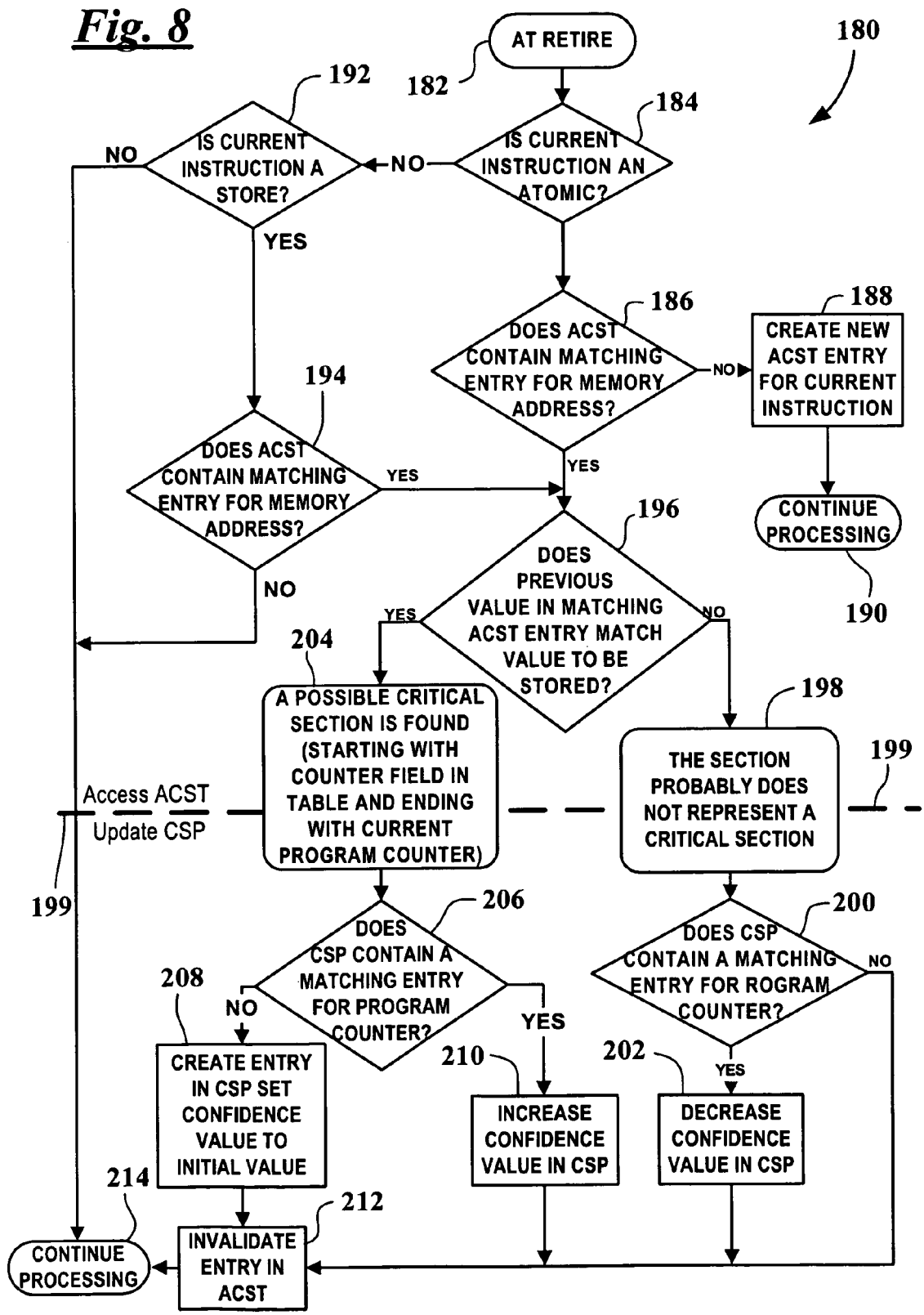
FIG. 8 shows a flowchart depicting an exemplary process for updating ACST and CSP tables.

FIG. 8 shows a detailed flow diagram 180 of an exemplary ACST and CSP populating algorithm. This procedure is executed on instruction retire as indicated by starting block 182. In block 184, the type of the current instruction is tested. If it is an atomic, the procedure flows to block 186 where the ACST is searched to determine whether it contains an entry having a matching memory address. If not, then the procedure flows to block 188 wherein a new ACST entry is created for the current instruction, then ending block 190 which ends the procedure. If block 186 determines that the ACST does contain a matching entry for the memory address, then the procedure flows to block 196.

Returning to block 184, if the current instruction is not an atomic, then the procedure flows to block 192 where it is determined whether the current instruction is a store. If not, then the procedure flows to ending block 214. If the current instruction is a store, then the procedure flows from block 192 to block 194 to determine if the ACST contains a matching entry for the memory address that the current instruction wishes to store data in. If there is no matching entry, then the procedure flows to ending block 214. Note that, since critical sections almost always begin with an atomic instruction, no entry is created in the ACST if the instruction is not an atomic. However, if the instruction is not an atomic but a store instruction, it could potentially end a critical section. Therefore, the procedure flows from block 194 to block 196 in that case.

At block 196, it has been determined that the current instruction is either an atomic or a store, and that there is an entry in the ACST having a matching memory address as that addressed by the current instruction. Block 196 tests whether the previous value stored in the location defined by that address is the same as the value to be stored by the current atomic or store instruction. Referring back to FIG. 2, remember that a critical section is determined by an instruction pattern whereby location A is changed from v to w, then, after one or more instructions not modifying location A, location A is changed back to v. Block 196 tests whether the value in the memory location identified by the ACST as matching the currently memory location for the atomic or store instruction is being reset back to its initial value by comparing the previous value stored in the ACST with the value to be stored by the current atomic or store instruction.

If the values do not match, then the entry in the ACST does not start a critical section as indicated by information block 198. In this case the procedure then flows to block 200 where the CSP is checked for an entry having a program counter number that matches the program counter number in the ACST entry. If not, then the current ACST entry is invalidated at block 212 and the procedure ends with ending block 214. However, if the CSP does have a matching entry at block 200, then the confidence value field is decreased at block 202, and the procedure flows to blocks 212 where the current ACST entry is invalidated.

If, at block 196, the ACST entry does contain a memory value matching the current value to be stored, then a possible critical section is identified as indicated with information block 204 and the procedure continues to block 206 where the CSP is searched for an entry having a program counter number that matches the program counter number of the matching ACST entry. If there is a matching CSP entry, then the procedure flows to block 210 where the confidence value is increased at block 210 thereby indicating increased confidence that the currently-identified critical section is indeed an elidable critical section. The procedure then flows from block 210 to block 212 to invalidate the current ACST entry, then to ending block 214.

If, at block 206, it is determined that the CSP does not contain an entry having a program counter number matching the program counter number contained in the current matching ACST entry, then a CSP entry is created and the newly-created CSP entry is provided with a confidence value set to an initial amount.

Note that blocks 202 and 210 decrease and increase, respectively the confidence value of the matching CSP entry. Depending on the number of bits of the confidence value and other factors, these amounts may vary, and are not necessarily incremental. For example, since the cost of lock elision failure is much greater than the cost of not eliding when elision would have been successful, it is considered that conservatively increasing the confidence value while at the same time decreasing the value by more than the increases may be prudent. For example, for a two-bit confidence value, increases can be made by incrementing or adding 1, and decreases can be made by subtracting 2. For block 208, the confidence value may be initialized, for example, at 1. These values are for exemplary purposes only and the actual values will depend on a number of factors with which the practitioner will be familiar.

As can be seen, the procedure outlined by flowchart 180 can be divided into two sections indicated by dividing line 199. The portion above dividing line 199 is directed at accessing and updating the ACST while the portion below dividing line 199 is directed to updating the CSP.

Figures 9, 10:
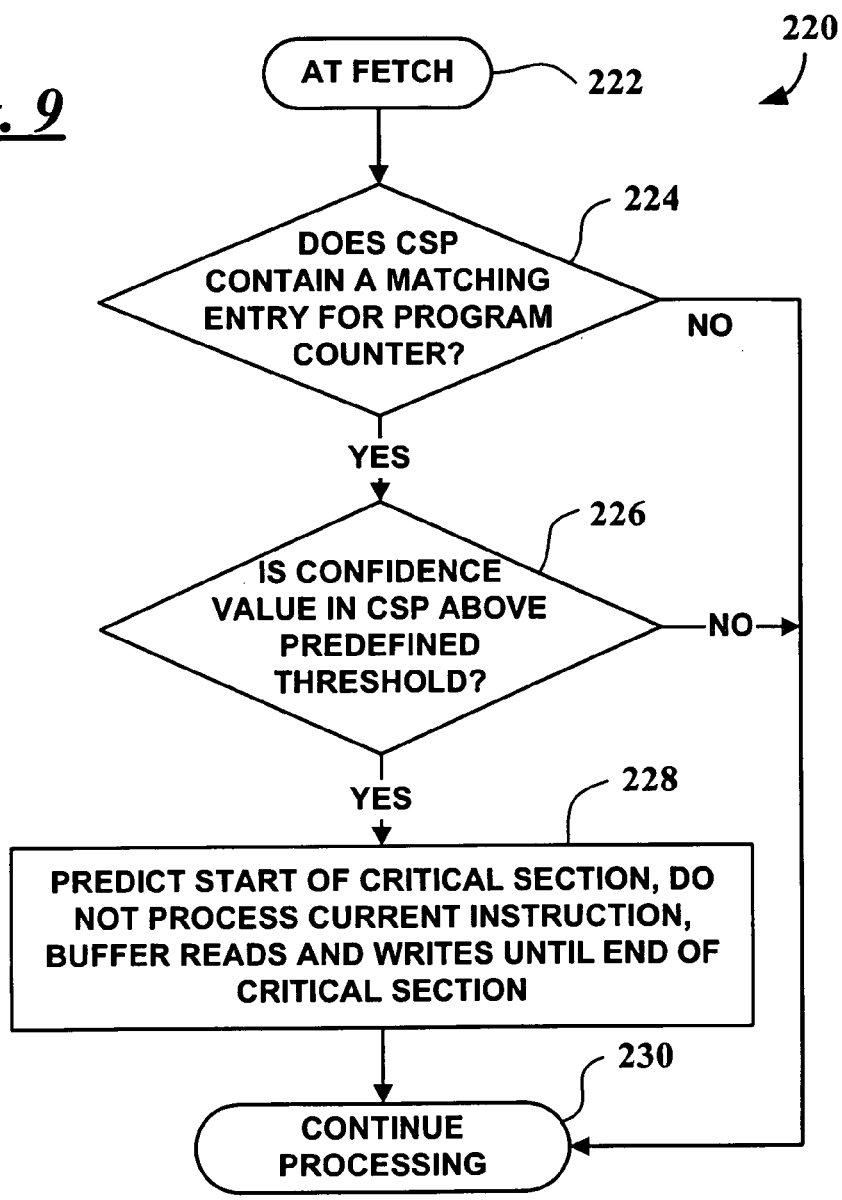
FIG. 9 shows a flowchart depicting an exemplary process for accessing CSP tables and implementing intelligent section elision.
FIG. 10 shows an exemplary expanded ACST.

FIG. 9 provides flowchart 220 showing a more detailed look at accessing the CSP to perform intelligent lock elision. This procedure is executed upon fetching an instruction as indicated by starting block 222. Block 224 searches the CSP for an entry containing a program counter number that matches the current program counter number of the fetched instruction. If the CSP does not contain a matching entry, then the procedure flows to ending block 230 whereupon the fetched instruction is processed normally.

If the CSP contains a matching entry in block 224, then the procedure flows to block 226 wherein the confidence value in the matching entry is compared with a predefined threshold. The threshold can be any suitable value, and for a two bit confidence value, it may be, for example, 1 or 2. If the confidence value is not above the threshold, then the procedure flows to ending block 230 whereupon the fetched instruction is processed normally. However, if the confidence value is above the threshold, then the procedure flows to block 228 wherein the fetched instruction is predicted to begin a critical section that may be elided. In this case, the fetched instruction is not processed, and all reads and writes are buffered until the end of the critical section. Details of a procedure for eliding critical sections is available, for example, in the paper by Rajwar and Goodman cited above and incorporated herein by reference.

FIGS. 4, 5, 8, and 9 will now be referenced to present the following illustrative example. Suppose an atomic instruction storing a value 0x3401 into memory address 0x4a872c8 sometime after instruction at program counter 0x1029aa4 is encountered. On retiring this instruction, the procedure outlined by flowchart 180 in FIG. 8 is executed. At block 184, it is determined that the instruction is indeed an atomic and the procedure flows to block 186. Here, ACST 150 is searched for an entry having a matching memory address. In fact, ACST 150 shown in FIG. 5 does contain a matching entry. The second entry has a memory address of 0x4a872c8 which is the same memory address the currently retiring instruction contains. The procedure in FIG. 8 therefore flows to block 196 to test whether the matching ACST entry has a value 0x3401 which is the value to be stored by the current instruction. In fact, ACST 150 does contain a matching memory address as well as the same previous value. The pattern described in FIG. 2 has therefore been established wherein the original value is being restored in a memory location that was earlier changed by an atomic. Information block 204 indicates that a possible critical section is found starting with the instruction pointed to by the program counter field in ACST 150 and ending with the current program counter number.

Continuing with block 206, the CSP is searched to see if it contains a matching entry for a program counter. Referring to CSP 140 shown in FIG. 4, the second line therein contains a matching entry. Therefore the procedure in FIG. 8 is followed to block 210 wherein the confidence value is increased. The procedure then flows to block 212 where the current entry in ACST 150 is invalidated and the procedure ends at ending block 214.

Now suppose that instruction at program counter 0x1032f44 is to be fetched. Looking to FIG. 9, begin with starting block 222 and proceed to block 224 wherein CSP is searched for a matching program counter number. Here, the first entry in CSP 140 (FIG. 4) contains a matching program counter number, so the procedure flows to block 226 in flowchart 220 wherein confidence value in the matching entry, which is 0x10, is compared with a predetermined threshold. Assuming that the predetermined threshold is 0x01, since 0x10>0x01, confidence that the current instruction is an elidable exclusive lock is high. Thus, the procedure flows to block 228 where the critical section is predicted and the lock is elided in accordance with a known technique such as that outlined in the paper by Rajwar and Goodman cited above and incorporated herein by reference.

As mentioned previously, hardware mechanisms for speculatively locking are effective only with small critical sections due to limitations on the cache size and because all loads and stores must be held in hardware buffers while executing in the critical section. Buffering loads and stores is necessary to maintain the effective atomicity of the critical section. Though the majority of dynamic critical sections are small, some critical sections are so large that the number of load/store buffers needed for lock speculation is too expensive to implement. When such critical sections are speculatively executed, the speculation fails because of insufficient buffer size. FIGS. 10, 11, 12, and 13 present possible extension of the procedure outlined above to avoid elision of exclusive locks of long critical sections.

FIG. 10 shows an expanded ACST including the same fields presented in ACST 150 shown in FIG. 5, including a critical section program counter field 242, memory address field 244, and previous value field 246. In addition, short section indicator fields are provided which may include one or more of a load count filed 248, a store count field 250, and an instruction count field 252. Note that exemplary data is provided for illustrative purposes only and does not form part of the invention. As will be explained in detail below, these short section indicators allow more intelligent prediction of elidable locks by avoiding eliding locks on long critical sections doomed to fail due to buffer size limitations. However, at the outset it should be noted that these fields may be optionally used. Furthermore, one or more of them may be used. For example, an instruction count may be used without load or store counts. Likewise, load and store count fields may be used without the instruction count. Furthermore, the load and store counts can be used separately or combined into a field containing the sum of load and store instructions. A person having ordinary skill will understand possible such modifications and means for such implementations, all of which are within the scope of the invention.

Figure 11:
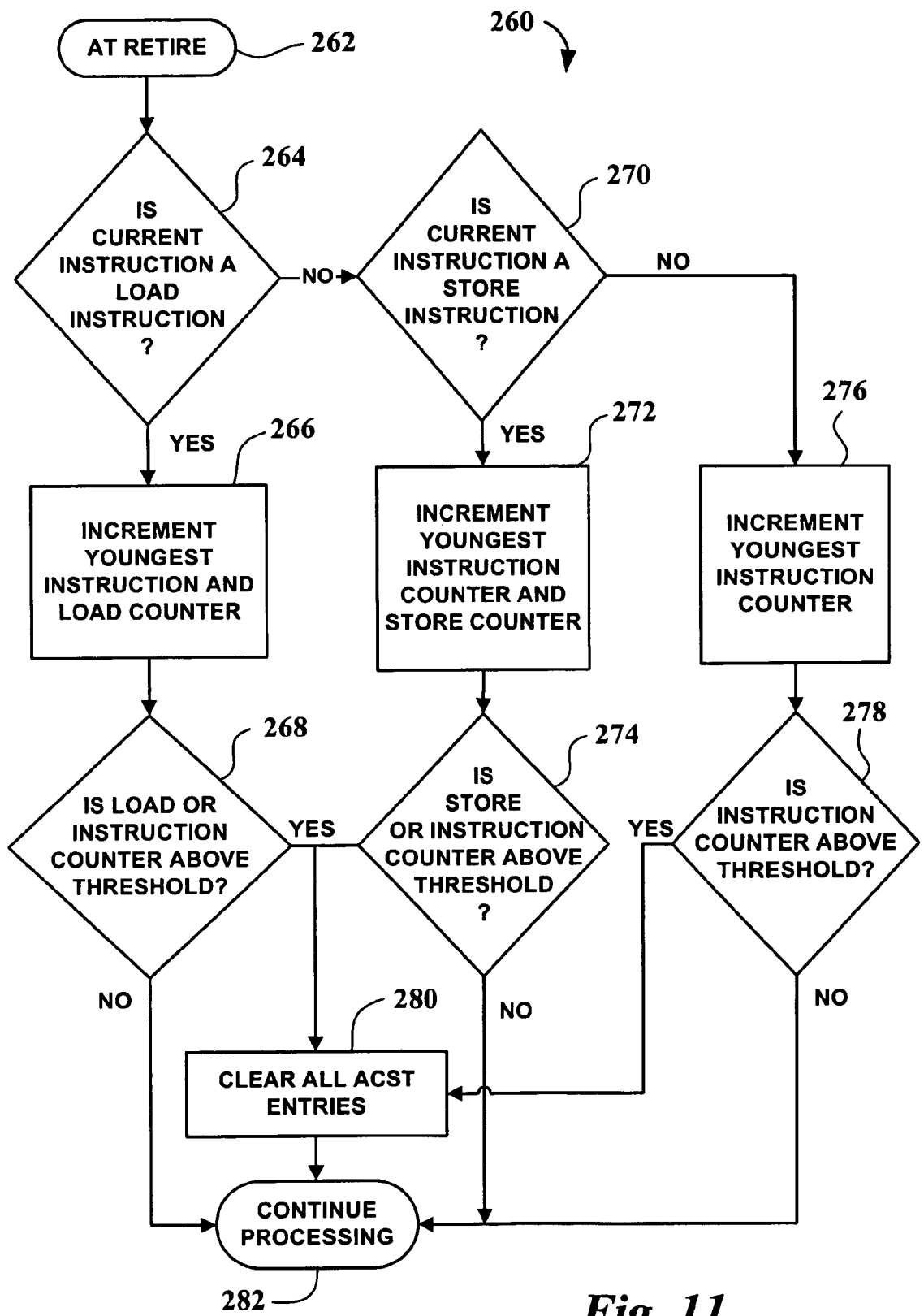
FIG. 11 shows a flowchart depicting an exemplary process for updating short section indicator fields in the expanded ACST of FIG. 10.

FIG. 11 shows an exemplary flowchart 260 for populating the expanded ACST fields containing short section indicators. This procedure is executed on instruction retire as indicated by starting block 262. Block 264 tests whether the current instruction is a load instruction. If not, the procedure flows to block 270 which tests whether the current instruction is a store instruction. If, at block 264, the procedure determines that the current instruction is a load instruction, then the procedure flows to block 266 where the youngest instruction and load counters are incremented. Likewise, if, at block 270, it is determined that the instruction is a store instruction, then the procedure flows to block 272 where the youngest instruction counter and store counter are incremented. Finally, if, at block 270 it is determined that the current instruction is not a store instruction, then the procedure flows to block 276 where just the youngest instruction counter is incremented.

The reason that only the youngest counter is incremented will now be explained. Note that each ACST entry corresponds to an active possible critical section. Because critical sections can be nested, the current instruction may be in more than one critical section at a time. Thus, to account for all critical sections, only the inner most critical section, i.e., the one corresponding to the youngest ACST entry, is tracked. As will be described below with reference to FIG. 12, on eviction, the short section indicator fields of the youngest ACST entry are added to that of the next youngest entry.

After the counters are incremented in blocks 266, 272, and 276, these respective counters are compared to respective thresholds in blocks 268, 274, and 278. Each counter may be compared to a respective threshold or to a common threshold depending upon the circumstances. If any counter is above its threshold, then the procedure flows to block 280 wherein all ACST entries are cleared. Note that if the youngest entry is over a threshold, then all entries (which would eventually be added to the youngest) would also be over the threshold. Once the threshold is exceeded, the critical section is determined to be not elidable because the buffer cannot accommodate it, and therefore safer to not elide. After all ACST entries are cleared in block 280, the procedure flows to ending block 282 where processing continues. If none of the instructions are above a threshold in blocks 268, 274, and 278, then the procedure flows to block 282 for continued processing.

In flowchart 260, long critical sections are avoided by comparing short section indicators to thresholds, and clearing the ACST entries when one of the short section indicators exceeds its threshold.

Figure 12:
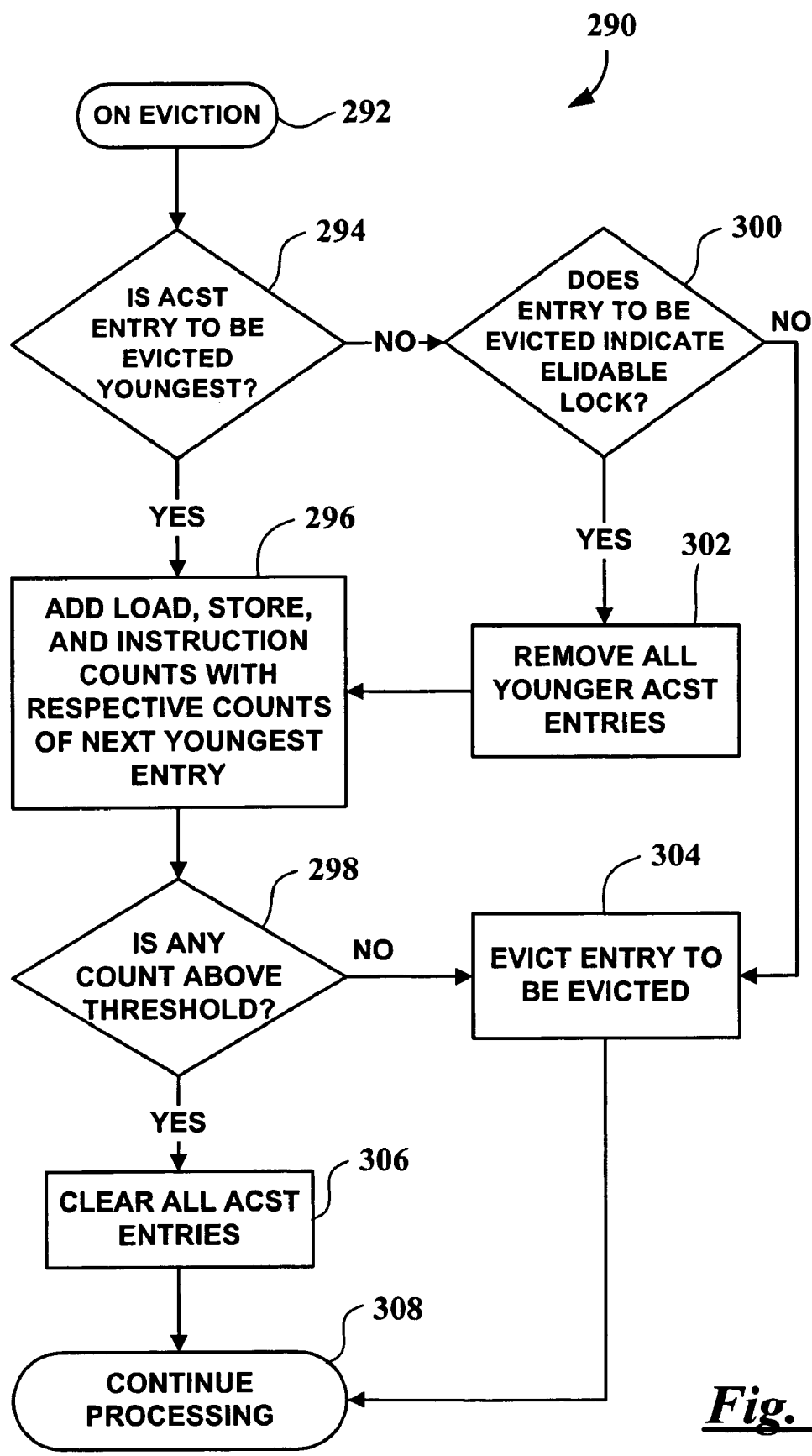
FIG. 12 shows a flowchart depicting an exemplary process for evicting entries in an expanded ACST.

FIG. 12 presents a flowchart 290 for updating short section indicators in expanded ACST table 240 (FIG. 10) and is executed when an ACST entry is evicted, e.g., at block 212 in flowchart 180 in FIG. 8, as shown by starting block 292. At block 294 the procedure determines whether the block to be evicted is the youngest entry in the ACST. If it is, that means that the ACST entry to be evicted corresponds to the innermost nested critical section. In this case, the procedure flows from block 294 to block 296 where load, store, and instruction counters are added to respective counts of the next youngest ACST entry. The procedure then flows to block 298 where these counts are checked to see if they are above their respective thresholds as described above with respect to FIG. 11. If not, there is no further issue and the entry to be evicted is evicted at block 304.

However, if, at block 298, the next youngest entry now has a value that exceed a threshold, then the procedure flows to block 306 and all entries are evicted. In this case, the youngest entry is completed and was to be evicted anyway while the next youngest entry (and therefore all outer nested critical sections) indicates that the corresponding critical section is too long and therefore these entries are cleared at block 306.

Returning to block 294, when the ACST entry to be evicted is not the youngest, that means one of two things has happened: Either the current entry is being evicted because it does not point to a critical section, or the current entry points to a valid critical section, i.e., refers to a section that meets the requirements of FIG. 2. In the latter case, all younger entries are invalid since they point to a critical sections that overlap (and not nested inside) the critical section pointed to by the current entry. Since overlapping non-nested critical sections are not permitted, the younger entries must not be pointing to true critical sections, and therefore should be evicted.

Block 300 determines which of these conditions apply by checking whether the current entry to be evicted indicates an elidable lock. Referring back to flowchart 180 in FIG. 8, when the procedure flows to information block 204 it is known that the ACST points to a possible critical section whereas when the procedure flows to information block 198, the ACST entry probably does not point to a critical section having an exclusive lock that can be elided. Therefore, the answer to the test posed by block 300, "Does the entry to be evicted indicate an elidable lock?" depends on the direction the procedure took in flowchart 180. If the answer is no, then the current ACST entry is being evicted because it does not point to a critical section and therefore the entry can be removed without regard to younger entries. Thus, the procedure flows to block 304 where the entry to be evicted is actually evicted.

However, if block 300 results in a yes, then that means a younger entry in the ACST points to a potential critical section that begins inside the current one, but ends outside it (since it is still present in the ACST, the corresponding critical section has not ended yet). Since overlapping non-nested critical sections are not permitted, all younger entries need to be evicted. Therefore, the procedure flows to block 302 where all younger entries are evicted.

When using an expanded ACST, the short section indicator fields in the ACST must be added together. Thus, from block 302 the procedure flows back to block 296 wherein short section indicator fields for all ACST entries younger than the current entry, and the current entry, are added to the next youngest entry. The procedure then flows to block 298 as described above.

The steps outlined in blocks 294, 300, 302, and 304 are executed whether a simple ACST as shown in FIG. 5 is used, or an expanded ACST as shown in FIG. 10 having one or more additional short section indicator fields such as load count, store count, and/or instruction count is used.

Figure 13:
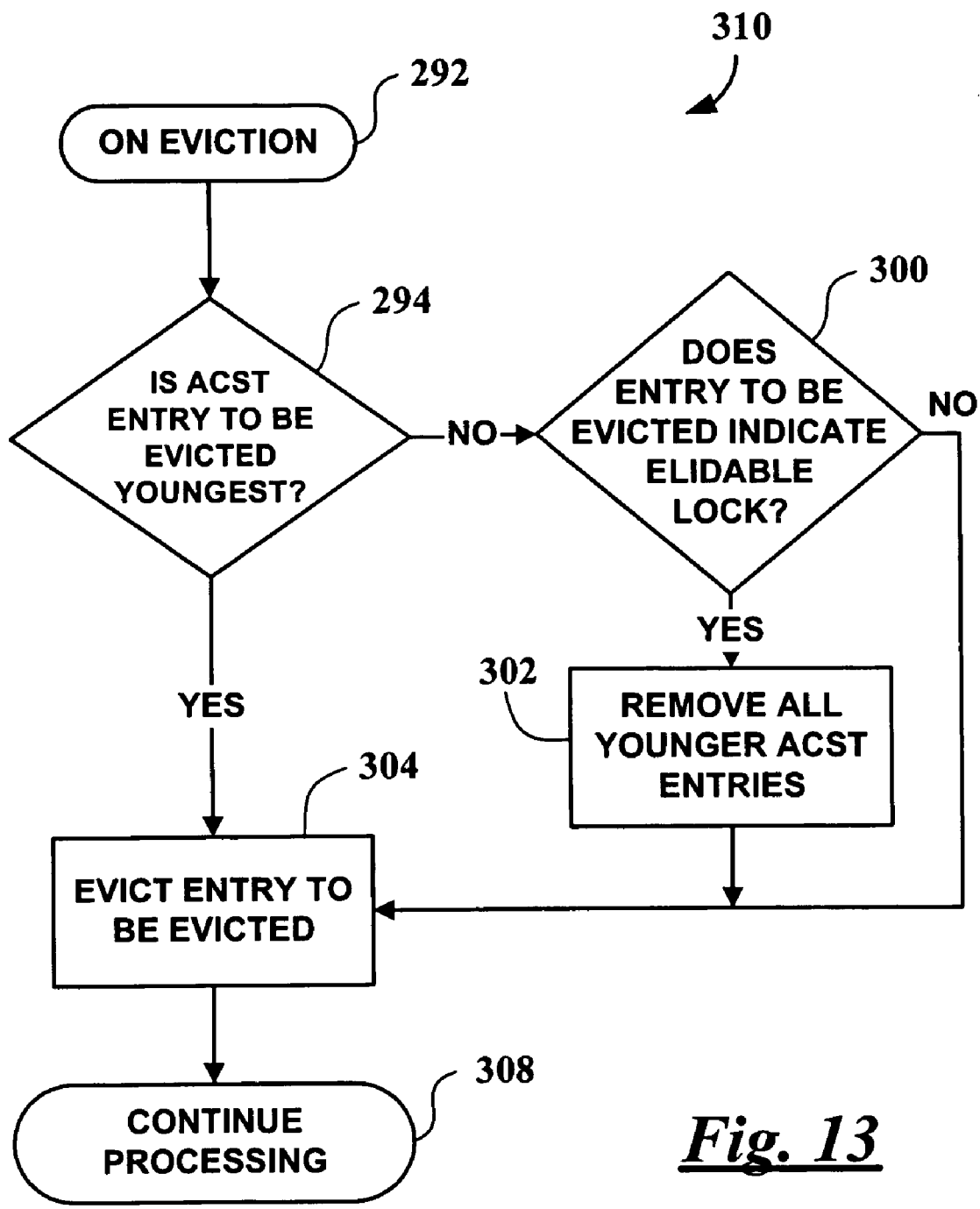
FIG. 13 shows a flowchart depicting a simplified version of the flowchart of FIG. 12 for evicting entries in the simple ACST shown in FIG. 5.

If the simple ACST shown in FIG. 5 having only program counter, memory address, and previous value fields is used, then the procedure outlined in flowchart 290 is simplified as shown by flowchart 310 in FIG. 13. The operations outlined in blocks 294, 300, 302, and 304 and described above are executed whether the simple ACST or the expanded ACST is used. If the simple ACST is used, the procedure would flow from block 302 to block 304 to evict the current ACST entry as shown in flowchart 310. In addition, from block 294, if the ACST entry to be evicted is youngest, then procedure flows directly to block 304 wherein the youngest entry is evicted.

Both flowcharts 290 and 310 operate to evict the entry if it is the youngest, and if not, remove all younger entries when the current entry refers to an elidable lock.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for predicting critical sections, the method comprising:
   updating a critical section estimator based on historical analysis of atomic/store instruction pairs during runtime, the atomic/store instruction referring to a memory location, the memory location of the atomic/store instruction used to obtain a value within the memory location, wherein the updating is based on a match entry found in a first table for a memory address corresponding to the memory location and the value in the memory location of the atomic/store instruction and wherein the critical section estimator is indicative of the atomic/store instruction pairs defining start of a critical section; and
   performing lock elision when said critical section estimator indicates said atomic/store instruction pairs define a critical section,
   wherein said estimator comprises a second table having a plurality of entries each corresponding to potential critical sections, each entry including a confidence value that, when above a selected threshold, indicates corresponding atomic/store instruction pairs define said critical section and said critical section estimator tracks atomics not likely to start a critical section and the performing lock elision is executed when said critical section estimator does not indicate a current atomic instruction that does not begin a critical section.

2. The method of claim 1, wherein said updating comprises:
   when atomically changing the value in the memory location, recording in an entry in said first table a program counter number, the memory address corresponding to said memory location, and previous value in said memory location;
   searching said first table for a matching entry having a matching memory address of the atomic or store instruction; and
   updating said critical section estimator based on whether said matching entry has a previous value matching a value to be stored by said atomic or store instruction.

3. The method of claim 1, wherein:
   said second table is a critical section predictor (CSP) and each entry in said CSP includes a CSP program counter number and said confidence value; and
   said updating further comprises:
      searching said CSP for a matching CSP entry in which said CSP program counter number matches said program counter number in said matching entry in said first table;
      increasing said confidence value when said matching CSP entry is found and said previous value matches said value to be stored by said atomic or store instruction;
      decreasing said confidence value when said matching CSP entry is found and said previous value does not match said value to be stored by said atomic or store instruction; and
      creating a matching CSP entry when said matching CSP entry is not found and said previous value matches said value to be stored by said atomic or store instruction, said creating comprising copying said program counter number from said matching entry in said first table and initializing said confidence value in a new entry in said CSP.

4. The method of claim 2, further comprising invalidating said matching entry in said first table after said updating.

5. The method of claim 2, wherein said recording occurs only when said first table does not already contain said matching entry.

6. The method of claim 5, wherein said recording further comprises,
   initializing at least one short critical section indicator in said entry of said first table, said at least one short critical section indicator being one or more of a load count, a store count, and an instruction count;
   setting a flag during said recording an entry to indicate execution is potentially within a critical section;
   updating said at least one short critical section indicator while said flag is set to track at least one of a number of instructions, load statements and store statements; and said updating said critical section estimator is additionally based on said at least one short critical section indicator.

7. The method of claim 6, wherein:
said updating includes determining that said critical section is sufficiently short when at least one of said at least one short critical section indicator is below a selected threshold; and
said updating includes predicting a current section is a critical section when said critical section is determined to be sufficiently short.

8. The method of claim 6, wherein said at least one short critical section indicator is a single one of said load count, said store count, and said instruction count.

9. The method of claim 8, wherein said at least one short critical section indicator is said instruction count.

10. The method of claim 6, wherein said at least one short critical section indicator is selected from a group consisting of said load count and said store count.

11. A microprocessor having devices integrated therein implementing a method for predicting critical sections, comprising:
updating a critical section estimator based on historical analysis of atomic/store instruction pairs during runtime, the atomic/store instruction referring to a memory location, the memory location of the atomic/store instruction used to obtain a value within the memory location, wherein the updating is based on a match entry in a first table found for a memory address corresponding to the memory location and the value in the memory location of the atomic/store instruction and wherein the critical section estimator is indicative of the atomic/store instruction pairs defining start of a critical section; and
performing lock elision when said critical section estimator indicates said atomic/store instruction pairs define a critical section,
wherein said estimator comprises a second table having a plurality of entries each corresponding to potential critical sections, each entry including a confidence value that, when above a selected threshold, indicates corresponding atomic/store instruction pairs define said critical section and said critical section estimator tracks atomics not likely to start a critical section and the performing lock elision is executed when said critical section estimator does not indicate a current atomic instruction that does not begin a critical section.

12. The microprocessor of claim 11, wherein said updating comprises:
when atomically changing the value in the memory location, recording in an entry in said first table a program counter number, the memory address corresponding to said memory location, and previous value in said memory location;
searching said first table for a matching entry having a matching memory address of the atomic or store instruction; and
updating said critical section estimator based on whether said matching entry has a previous value matching a value to be stored by said atomic or store instruction.

13. The microprocessor of claim 12, wherein:
said second table is a critical section predictor (CSP) and each entry in said CSP includes a CSP program counter number and said confidence value, and
said updating further comprises:
searching said CSP for a matching CSP entry in which said CSP program counter number matches said program counter number in said matching entry in said first table;
increasing said confidence value when said matching CSP entry is found and said previous value matches said value to be stored by said atomic or store instruction;
decreasing said confidence value when said matching CSP entry is found and said previous value does not match said value to be stored by said atomic or store instruction; and
creating a matching CSP entry when said matching CSP entry is not found and said previous value matches said value to be stored by said atomic or store instruction, said creating comprising copying said program number from said matching entry in said first table and initializing said confidence value in a new entry in said CSP.

14. The microprocessor of claim 12, wherein said method further comprising invalidating said matching entry in said first table after said updating.

15. The microprocessor of claim 12, wherein said recording occurs only when said first table does not already contain said matching entry.

16. The microprocessor of claim 15, wherein said recording further comprises, initializing at least one short critical section indicator in said entry of said first table, said at least one short critical section indicator being one or more of a load count, a store count, and an instruction count;
setting a flag during said recording an entry to indicate execution is potentially within a critical section;
updating said at least one short critical section indicator while said flag is set to track at least one of a number of instructions, load statements and store statements; and
said updating said critical section estimator is additionally based on said at least one short critical section indicator.

17. The microprocessor of claim 16, wherein:
said updating includes determining that said critical section is sufficiently short when at least one of said at least one short critical section indicator is below a selected threshold; and
said updating includes predicting a current section is a critical section when said critical section is determined to be sufficiently short.

18. The microprocessor of claim 16, wherein said at least one short critical section indicator is a single one of said load count, said store count, and said instruction count.

19. The microprocessor of claim 18, wherein said at least one short critical section indicator is said instruction count.

20. The microprocessor of claim 16, wherein said at least one short critical section indicator is selected from a group consisting of said load count and said store count.

* * * * *